United States Patent
Kokkinos et al.

(10) Patent No.: US 10,618,823 B2
(45) Date of Patent: Apr. 14, 2020

(54) WASTEWATER TREATMENT SYSTEMS AND METHODS

(71) Applicant: Babcock Power Environmental Inc., Marlborough, MA (US)

(72) Inventors: Angelos Kokkinos, Ayer, MA (US); Matthew Quitadamo, West Boylston, MA (US)

(73) Assignee: Babcock Power Environmental Inc., Marlborough, MA (US)

( * ) Notice: Subject to any disclaimer, the term of this patent is extended or adjusted under 35 U.S.C. 154(b) by 0 days.

(21) Appl. No.: 16/199,959

(22) Filed: Nov. 26, 2018

(65) Prior Publication Data

US 2019/0092649 A1    Mar. 28, 2019

Related U.S. Application Data

(62) Division of application No. 15/042,605, filed on Feb. 12, 2016, now Pat. No. 10,138,139.

(51) Int. Cl.
*C02F 1/10* (2006.01)
*B01D 1/14* (2006.01)
(Continued)

(52) U.S. Cl.
CPC .............. *C02F 1/10* (2013.01); *B01D 1/0041* (2013.01); *B01D 1/0058* (2013.01); *B01D 1/06* (2013.01); *B01D 1/14* (2013.01); *B01D 1/16* (2013.01); *B01D 1/18* (2013.01); *B01D 1/30* (2013.01); *C02F 1/043* (2013.01); *C02F 1/048* (2013.01); *C02F 1/12* (2013.01); *C02F 1/16* (2013.01); *C02F 1/28* (2013.01); *C02F 2101/103* (2013.01); *C02F 2101/106* (2013.01);
(Continued)

(58) Field of Classification Search
CPC ...... C02F 1/10; C02F 1/12; C02F 1/16; C02F 2101/103; C02F 2101/106; C02F 2101/20; C02F 2103/18; C02F 2301/046; B01D 1/14–18
See application file for complete search history.

(56) References Cited

U.S. PATENT DOCUMENTS 3,926,129 A    12/1975 Wall
8,585,869 B1    11/2013 Duesel, Jr. et al.
(Continued)

FOREIGN PATENT DOCUMENTS

EP    2246531 A1    11/2010

OTHER PUBLICATIONS

Xinjun, T., et al., "A Pilot Demonstration of Spray Dryer evaporation as a Method to Treat Power Plant FGD Wastewater", IWC 12-43, 73rd Annual Intl. Water Conf., No. 4-8, 2012.
(Continued)

*Primary Examiner* — Renee Robinson
(74) *Attorney, Agent, or Firm* — Locke Lord LLP; Joshua L. Jones; Alicia J. Carroll

(57) ABSTRACT

A wastewater treatment system includes a circulating fluidized bed evaporator defining a longitudinal axis vertical with respect to gravity. The evaporator has a wastewater inlet to provide wastewater to the circulating fluidized bed evaporator. A heat inlet is axially below the wastewater inlet to provide heat to the circulating fluidized bed evaporator for evaporating the wastewater. An outlet is axially above the wastewater inlet and the heat inlet.

7 Claims, 2 Drawing Sheets

(51) Int. Cl.
| | |
|---|---|
| *B01D 1/16* | (2006.01) |
| *C02F 1/16* | (2006.01) |
| *B01D 1/06* | (2006.01) |
| *B01D 1/00* | (2006.01) |
| *C02F 1/04* | (2006.01) |
| *B01D 1/18* | (2006.01) |
| *C02F 1/12* | (2006.01) |
| *B01D 1/30* | (2006.01) |
| *C02F 1/28* | (2006.01) |
| *C02F 101/10* | (2006.01) |
| *C02F 101/20* | (2006.01) |
| *C02F 101/32* | (2006.01) |
| *C02F 103/02* | (2006.01) |
| *C02F 103/18* | (2006.01) |

(52) U.S. Cl.
CPC .... *C02F 2101/20* (2013.01); *C02F 2101/322* (2013.01); *C02F 2103/023* (2013.01); *C02F 2103/18* (2013.01); *C02F 2301/046* (2013.01); *C02F 2303/10* (2013.01); *Y02W 10/30* (2015.05)

(56) References Cited

U.S. PATENT DOCUMENTS

| | | |
|---|---|---|
| 2002/0088703 A1 | 7/2002 | Walker |
| 2004/0099522 A1 | 5/2004 | Neubert et al. |
| 2006/0130487 A1 | 6/2006 | Kashler |
| 2009/0165460 A1 | 7/2009 | Juretzek |
| 2010/0230635 A1 | 9/2010 | Dubois |
| 2012/0199534 A1 | 8/2012 | Holtzapple et al. |
| 2012/0237423 A1* | 9/2012 | Bialkin ................ B01D 53/346 423/240 R |
| 2013/0248121 A1 | 9/2013 | Ukai et al. |
| 2014/0216033 A1 | 8/2014 | Duesel, Jr. et al. |
| 2015/0182910 A1 | 7/2015 | Rader et al. |
| 2015/0251144 A1 | 9/2015 | Amslinger et al. |

OTHER PUBLICATIONS

Ito, M. et al., "MHI's Simple Zero Liquid Discharge System for Wet FGD", Power Plant Air Pollutant Control "MEGA" Symposium, 2012, Aug. 20-23, 2012.

Gansley, R., et al., "Approaches for Reducing and Eliminating WFGD Waste Water for Coal-Fired Power Plants", Paper # 6, Power Plant Pollutant Control "MEGA" Symposium, Aug. 2014.

Brodsky, I., et al., "Wet FGD Wastewater Treatment Options: Planning for the Future Regulatory Environment", 2010.

Water Systems Specialists, Inc., "Treatment Technology Summary for Critical Pollutants of Concern in Power Plant Wastewaters", EPRI, Palo Alto, CA, Jan. 2007, 1012549.

Riffe, M., et al., "Wastewater Treatment for FGD Purge Streams", Paper # 33, MEGA Symposium, 2008, Baltimore, MD, Aug. 25-28, 2008.

Honjo, S., et al., "MHI Wet-FGD Waste Water Treatment Technologies", Paper presented at 8th Power Plant Air Pollutant Control MEGA Symposium, Baltimore, MD, 1395-1429, Aug. 20, 2011-Sep. 2, 2011.

International Search Report and Written Opinion of the International Searching Authority dated May 11, 2017 in corresponding International Application No. PCT/US2017/016323.

* cited by examiner

WASTEWATER TREATMENT SYSTEMS AND METHODS

CROSS-REFERENCE TO RELATED APPLICATIONS

This application is a divisional application of U.S. patent application Ser. No. 15/042,605, filed on Feb. 12, 2016, the contents of which are incorporated herein by reference in their entirety.

BACKGROUND OF THE INVENTION

1. Field of the Invention

The present invention relates to water treatment and more particularly to systems and methods for wastewater treatment.

2. Description of Related Art

Significant amounts of water are used in steam generating plants, e.g. for producing electricity or other products. Water has many uses at the electric power plant ranging from cooling to waste product transport, to cleaning of steam generator heat transfer surfaces, to actively participating in the removal and capturing of pollutants. In the daily process of generating electricity, typical steam generating plants will use and dispose hundreds if not thousands of gallons of water.

The wastewater generated requires disposal and may contain materials, such as arsenic, mercury, and/or selenium that may need to be removed or reduced before disposal. There is a need, therefore, to either dispose the wastewater properly or totally eliminate the harmful materials from the water. Traditional wastewater treatment systems have generally been considered satisfactory for their intended purpose. However, there remains a need in the art for such systems and methods that are easy to make and use.

SUMMARY OF THE INVENTION

A wastewater treatment system includes a circulating fluidized bed evaporator defining a longitudinal axis vertical with respect to gravity. The evaporator has a wastewater inlet to provide wastewater to the circulating fluidized bed evaporator. A heat inlet is axially below the wastewater inlet to provide heat to the circulating fluidized bed evaporator for evaporating the wastewater. An outlet is axially above the wastewater inlet and the heat inlet.

In accordance with some embodiments, the heat inlet is in fluid communication with at least one of a flue gas slip stream drawn from a steam generating electrical power plant or a heater. An outlet flow path can be defined between the outlet and a gas path of the steam generating electrical power plant upstream from a plant particulate collection device. An inlet flow path can be defined between a gas path of the steam generating electrical power plant upstream from an air-preheater to the heat inlet of the circulating fluidized bed evaporator. The heat inlet can be in fluid communication with a flue gas slip stream drawn from a steam generating electrical power plant upstream from an air pre-heater.

The circulating fluidized bed evaporator can include a particulate supply inlet to supply at least one of fly ash or wastewater byproduct to the evaporator to improve mass and heat transfer characteristics within the circulating fluidized bed evaporator and to assist with the sorption of volatile material from the wastewater during evaporation. The particulate supply inlet can be axially above the heat inlet. The system can include a particulate collection device downstream from the outlet.

In accordance with some embodiments, the circulating fluidized bed evaporator includes a venturi section including a venturi section wall extending upward from a venturi section inlet to a venturi section outlet along the longitudinal axis. The venturi section wall can include a converging section and a diverging section. The wastewater inlet can be axially above the converging section, the outlet can be axially above the venturi section outlet, and/or the heat inlet can be axially below the venturi section inlet.

In accordance with another aspect, a method for treating wastewater includes providing heat to a circulating fluidized bed evaporator. The method includes injecting a fluid stream of wastewater into the evaporator. The heat evaporates liquid from the wastewater producing a gas and/or particulate effluent. The method includes passing the gas and/or particulate effluent through a particulate collection device to separate the gas effluent from the particulate effluent.

In accordance with some embodiments, the method includes returning the effluent to a gas path of a steam generating electrical power plant upstream from a plant particulate collection device. The method can include recycling at least a portion of the particulate effluent back to the evaporator to improve mass and heat transfer characteristics within the circulating fluidized bed evaporator. The method can include removing at least a portion of the particulate effluent from the wastewater treatment system downstream of the particulate collection device for disposal. Providing the heat to the evaporator can include drawing a flue gas slip stream from a gas path of a steam generating electrical power plant and injecting it into the evaporator. A flue gas temperature at a heat inlet of the evaporator can range from 450° F. to 800° F. A temperature of the gas effluent at an outlet of the evaporator can range from an acid gas dew point to 400° F. The method can include spraying particulate into the evaporator through a particulate supply inlet to improve mass and heat transfer characteristics within the circulating fluidized bed evaporator and to assist with the sorption of volatile from the wastewater during evaporation.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices of the subject invention without undue experimentation, preferred embodiments thereof will be described in detail herein below with reference to certain figures, wherein.

DETAILED DESCRIPTION OF THE PREFERRED EMBODIMENTS

Figure 1:
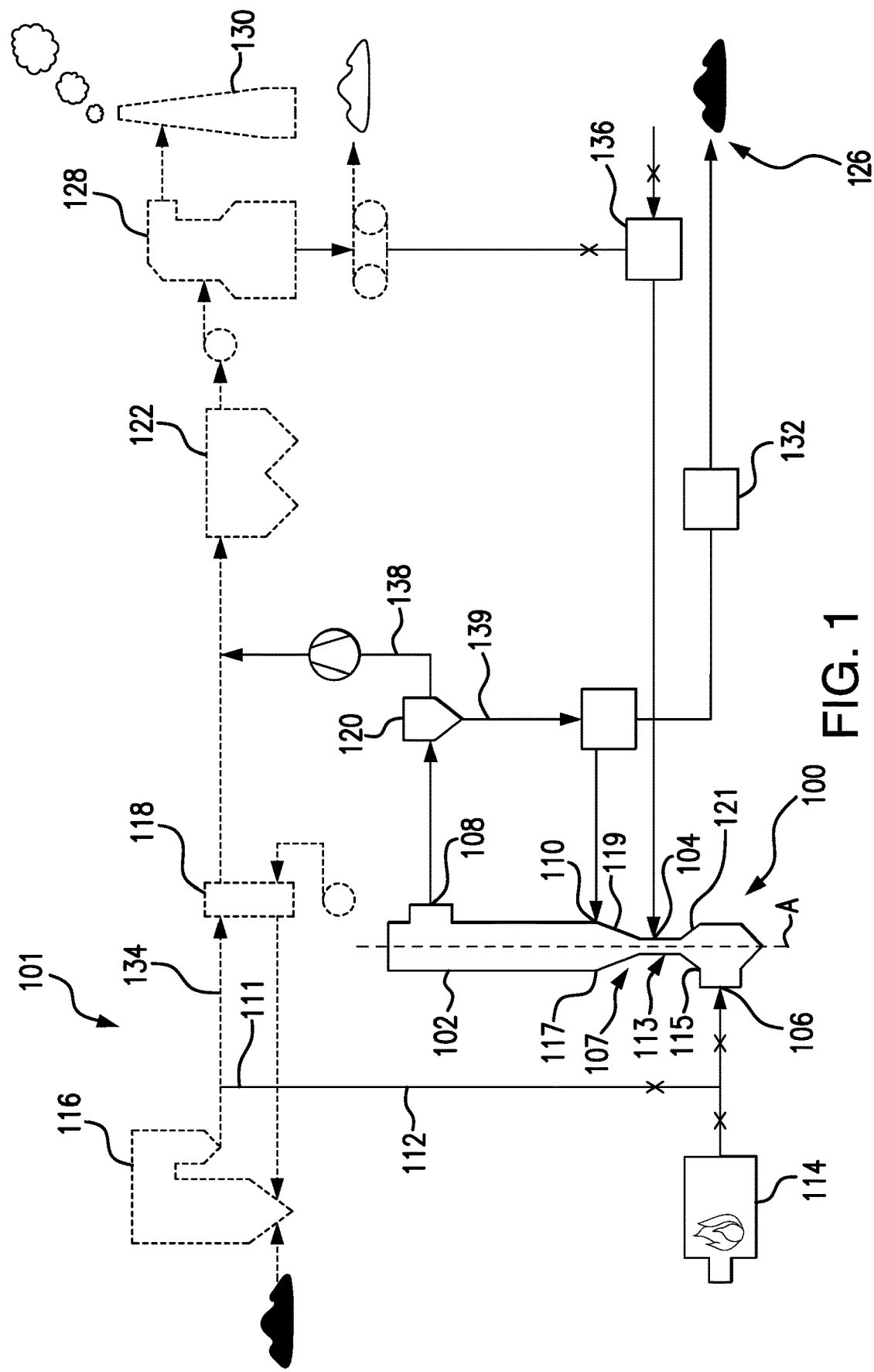
FIG. 1 is a schematic diagram of wastewater treatment system constructed in accordance with an embodiment of the present invention, showing the wastewater treatment system operatively connected to a steam generating electrical power plant.

Reference will now be made to the drawings wherein like reference numerals identify similar structural features or aspects of the subject invention. For purposes of explanation and illustration, and not limitation, a partial view of an exemplary embodiment of a wastewater treatment system in accordance with the disclosure is shown in FIG. 1 and is designated generally by reference character 100. Other features of wastewater treatment systems in accordance with the disclosure, or aspects thereof, are provided in FIG. 2, as will be described. Embodiments of the systems and methods described herein provide for wastewater systems with reduced residence evaporation time and reduced system size, prevent system plugging due to moisture condensation, and provide for safe particulate matter disposal.

As shown in FIG. 1, a wastewater treatment system 100 for a steam generating plant 101, e.g. a steam generating electrical power plant, includes a circulating fluidized bed evaporator 102 defining a longitudinal axis A. Longitudinal axis A is vertical with respect to gravity. Evaporator 102 has a wastewater inlet 104 to provide wastewater to circulating fluidized bed evaporator 102. A heat inlet 106 is axially below wastewater inlet 104 to provide heat to evaporator 102 for evaporating the wastewater. Wastewater is pumped to the evaporation chamber where it is atomized by either dual fluid or high pressure spray nozzles and rapidly vaporized. An outlet 108 is axially above wastewater inlet 104 and heat inlet 106. Heat inlet 106 is in fluid communication with a flue gas slip stream 111 drawn from steam generating plant 101 and/or a heater 114. High temperature flue gas is diverted from the steam generator 101 and introduced in an up flow direction at the bottom of evaporator 102, e.g. at heat inlet 106.

In accordance with some embodiments, an independent generator of hot flue gas, e.g. heater 114, can also be used in lieu of, or in conjunction with, the slip stream from steam generator 101. The flue gas provides the energy necessary to evaporate the wastewater being injected into evaporator 102. Depending on the evaporator type utilized (fast fluidized bed or suspension flow) and/or if system 100 includes a particulate collection device is used after outlet 108, a booster fan can be used to overcome pressure losses across the particulate collection device and to reintroduce the cooled flue gas into the gas path of generator 101 upstream of a separate particulate control device of steam generator 101.

With continued reference to FIG. 1, an outlet flow path 138 is defined between outlet 108 and a gas path 134 of steam generating plant 101 upstream from a plant particulate collection device 122, e.g. a power plant particulate collection device. An inlet flow path 112 is defined between gas path 134 upstream from an air-preheater 118 and downstream from boiler 116 to heat inlet 106 of circulating fluidized bed evaporator 102. Heat inlet 106 is in fluid communication with flue gas slip stream 111 drawn from power plant 101 upstream from air pre-heater 118. In accordance with some embodiments, system 100, or portions thereof, is installed as a retrofit kit where plant particulate collection device 122 is an existing particulate collection device and where system 100 includes an additional new particulate collection device 120 downstream from outlet 108. The existing particulate collection device 122 can be an electrostatic precipitator (ESP) or fabric filter, and the newly installed particulate collection device 120 can be a fabric filter, cyclone, or the like. Particulate collection device 120 removes any dried solids (i.e. fly ash, gypsum, salts, etc.) from effluent exiting outlet 108 prior to rejoining gas path 134.

Evaporator 102 includes a particulate supply inlet 110 to supply fly ash or recycled wastewater byproduct particulate to the evaporator 102 to improve mass and heat transfer characteristics within the circulating fluidized bed evaporator and assist with the sorption of volatile material from the wastewater during evaporation. Particulate supply inlet 110 is axially above heat inlet 106. While particulate supply inlet 110 is shown as being axially above heat inlet 106 and wastewater inlet 104, it is contemplated that particulate supply inlet can be located either above or below wastewater inlet 104 depending on the specific application. Injection of particulates through particulate supply inlet 110 generates a circulating fluidized bed of material (fly ash and/or wastewater byproduct) where the wastewater is injected and mixed with the hot flue gas to enhance evaporation by enhancing mass and heat transfer. When operated as a "fast fluidized bed", the resulting core-annulus solids behavior also helps prevent wall wetting in evaporator 102. As fly ash typically contains some amount of unburned carbon and trace elements such as CaO, it can act as a sorbent which could capture any pollutants that volatilize during the evaporation process. The high temperature of the flue gas evaporates the wastewater while the particulate provides a means of adsorbing any pollutants that maybe present in the wastewater. For example, the flue gas temperature at heat inlet 106 can range from 450° F. to 800° F. A temperature of the gas effluent at outlet 108 ranges from an acid gas dew point to 400° F.

After evaporation, a mixture of effluent flue gas and effluent recirculated fly ash is sent to particulate collection device 120 where the majority of captured particulates (fly ash) are recycled to the evaporator, indicated by recycle path 139. The remaining particulates pass through a particulate stabilization unit 132 and then pass out through system exit 126 for disposal. The mostly clean flue gas is sent to steam generator's particulate collection device 122 along outlet flow path 138, followed by wet flue gas desulfurization (WFGD) absorber 128, and is ultimately release to the atmosphere through stack 130. It is contemplated that particulate control device 120 downstream from evaporator 102 is optional and will depend on the several factors including the ash loading of the flue gas and the chemical composition of the wastewater. In accordance with some embodiments, materials such as activated carbon or lime can be added to evaporator 102 to reduce the amount of pollutants (e.g. acid gases, mercury, and/or selenium) present in the entering flue gas slip stream.

As shown in FIG. 1, system 100 includes a feed tank 136 to ensure that there is constant feed rate of wastewater to evaporator 102. Evaporator 102 includes a venturi section 107 including a venturi section wall 113 extending upward from a venturi section inlet 115 to a venturi section outlet 117 along longitudinal axis A. Venturi section wall 113 includes a converging section 121 and a diverging section 119. Wastewater inlet 104 is axially above converging section 121 in a cylindrical portion of venturi section 107. Outlet 108 is axially above the venturi section outlet 117. Heat inlet 106 is axially below venturi section inlet 115. Venturi section 107 can be similar to the venturi section and hub configuration described in U.S. patent application Ser. No. 14/040,114, filed on Sep. 27, 2013, and U.S. patent application Ser. No. 14/510,991, filed on Oct. 9, 2014, each of which is incorporated by reference herein in its entirety.

Figure 2:
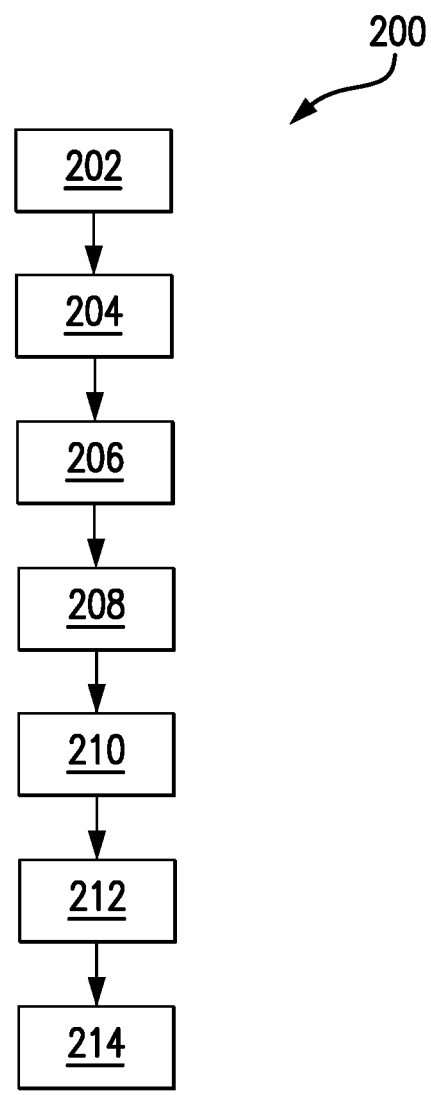
FIG. 2 is a flow chart schematically showing a method for wastewater treatment in accordance with an embodiment of the present invention.

As shown in FIG. 2, a method 200 for treating wastewater includes providing heat to a circulating fluidized bed evaporator, e.g. evaporator 102, as indicated by box 202. Providing the heat to the evaporator includes drawing a flue gas slip stream, e.g. slip stream 111, from a gas path, e.g. gas path 134, of a steam generating electrical power plant, e.g. electrical power plant 101, and injecting it into the evaporator. Method 200 includes injecting a fluid stream of wastewater into the evaporator, as indicated by box 204. Those skilled in the art will readily appreciate that the wastewater can have been generated from any of the following sources: wet flue gas desulfurization device, bottom and fly ash removal systems, ash pond runoff, boiler blowdown water, cooling tower blowdown, air preheater and boiler water washing waste, coal pile storm water runoff, and the like. The heat evaporates liquid from wastewater producing a gas and/or particulate effluent.

With continued reference to FIG. 2, method 200 includes spraying particulate into the evaporator through a particulate supply inlet, e.g. particulate supply inlet 110, to improve mass and heat transfer characteristics within the circulating fluidized bed evaporator and assist with the sorption of volatile material from the wastewater during evaporation, as indicated by box 206. Method 200 includes passing the gas and/or particulate effluent through a particulate collection device, e.g. particulate collection device 120, to separate the gas effluent from the particulate effluent, as indicated by box 208. The particulate collection device captures a majority of the solids contained in the dried effluent mixture exiting the evaporator for recycling back to the evaporator and for disposal.

As shown in FIG. 2, method 200 includes returning the effluent to a gas path, e.g. gas path 134, of a steam generating electrical power plant, e.g. power plant 101, upstream from a plant particulate collection device, e.g. power plant particulate collection device 122, as indicated by box 210. Method 200 includes recycling at least a portion of the particulate effluent back to the evaporator to improve mass and heat transfer characteristics within the circulating fluidized bed evaporator, as indicated by box 212. Method 200 includes removing at least a portion of the particulate effluent from the wastewater treatment system downstream of the particulate collection device for disposal, as indicated by box 214. Particulate solids of the effluent that are captured by the particulate collection device can be disposed of with the existing fly ash stream as-is or further stabilized in a stabilization unit, e.g. stabilization unit 132, prior to removal from the system.

The systems and methods for wastewater treatment described herein are less expensive, consume less energy and require reduced maintenance and operation compared with traditional wastewater treatment systems. Those skilled in the art will readily appreciate systems and methods described herein allow for the enhanced mass and heat transfer, resulting in reduced droplet evaporation time, and reduced evaporator height or overall size. Additionally, the core annular flow caused, at least in part, by the circulating fluidized bed enables solid particulates to continuously scour the walls of evaporator 102, thereby minimizing the risk of corrosion and solids deposition.

The systems of the present invention, as described above and shown in the drawings, provide for wastewater treatment systems with superior properties including reduced residence evaporation time, reduced system size, and reduced system plugging due to moisture condensation. While the systems and methods of the subject invention have been shown and described with reference to preferred embodiments, those skilled in the art will readily appreciate that changes and/or modifications may be made thereto without departing from the spirit and scope of the subject invention.

What is claimed is:

1. A method for treating wastewater comprising:
providing heat to a circulating fluidized bed evaporator;
injecting a fluid stream of wastewater into the evaporator, wherein the heat evaporates liquid from wastewater producing an effluent;
passing the effluent through a particulate collection device to separate a gas effluent from a particulate effluent; and
returning the gas effluent to a gas path of a steam generating electrical power plant, wherein returning the gas effluent to the gas path of the steam generating electrical power plant includes returning the gas effluent to the gas path of the steam generating electrical power plant upstream from a plant particulate collection device.

2. A method as recited in claim 1, further comprising recycling at least a portion of the particulate effluent back to the evaporator to improve mass and heat transfer characteristics within the circulating fluidized bed evaporator.

3. A method as recited in claim 1, further comprising removing at least a portion of the particulate effluent downstream of the particulate collection device for disposal.

4. A method as recited in claim 1, wherein providing the heat to the evaporator includes drawing a flue gas slip stream from the gas path of the steam generating electrical power plant and injecting it into the evaporator.

5. A method as recited in claim 4, wherein the flue gas temperature at a heat inlet of the evaporator ranges from 450° F. to 800° F.

6. A method as recited in claim 1, wherein a temperature of the gas effluent at an outlet of the evaporator ranges from an acid gas dew point of the gas effluent to 400° F.

7. A method as recited in claim 1, further comprising spraying particulate into the evaporator through a particulate supply inlet to improve mass and heat transfer characteristics within the circulating fluidized bed evaporator and assist with the sorption of volatile material from the wastewater during evaporation.

* * * * *